(12) United States Patent
Wright

(10) Patent No.: US 6,172,734 B1
(45) Date of Patent: Jan. 9, 2001

(54) SHUTTER

(75) Inventor: Bevan Wright, La Palma, CA (US)

(73) Assignee: Christie, Incorporated, Cypress, CA (US)

( * ) Notice: Under 35 U.S.C. 154(b), the term of this patent shall be extended for 0 days.

(21) Appl. No.: 09/452,053

(22) Filed: Nov. 30, 1999

(51) Int. Cl.$^7$ ................................................ G03B 9/10
(52) U.S. Cl. ........................ 352/208; 352/204; 352/212
(58) Field of Search .......................... 352/41, 143, 148, 352/204–220

(56) References Cited

U.S. PATENT DOCUMENTS

| | | | |
|---|---|---|---|
| 1,325,204 | * 12/1919 | Raleigh | 352/45 |
| 1,385,162 | * 7/1921 | Tillyer | 352/148 |
| 6,011,640 | * 1/2000 | Hutton | 359/234 |

* cited by examiner

Primary Examiner—Russell Adams
Assistant Examiner—Rodney Fuller
(74) Attorney, Agent, or Firm—Anora M. Vaccaro

(57) ABSTRACT

In a film projection system which contains a light source which emits a large amount of radiant energy and has means for advancing the film through a gate, there is a new and improved shutter comprising a high temperature rated, transmissive substrate having at least one area having a cold mirror coating affixed thereto and a second area with a hot mirror coating affixed thereto such that when the shutter rotates within the projector, the shutter area containing the cold mirror coating is placed in front of the light source when the film is moving through the gate and the shutter area containing the hot mirror coating is placed in front of the light source when the film is located within the gate, such that the thermal deformation of the film caused by the variations in the energy between the time the film is exposed and the time when the film is moving through the gate is minimized.

15 Claims, 3 Drawing Sheets

SHUTTER

FIELD OF THE INVENTION

This invention relates generally to motion picture systems and more particularly to a motion picture shutter apparatus for effectively increasing the focus resolution capability of a film projector.

BACKGROUND OF THE INVENTION

During the operation of a motion picture film projector, film is fed through a gate that usually is located in line with the light source and the synchronized shutter. The opening and closing of the shutter is synchronized so that it corresponds to the rate of the advancement of the film through the gate. In the prior art, the shutter usually resembles one of several shapes and is wholly opaque over a portion of the surface. For example, the shutter may be a semicircle; have two or more opaque blades; or may be barrel shaped. The prior art shutters usually are comprised of a metallic material, typically steel or aluminum. Each of these prior art shutter designs are effective for blocking the light when they are synchronized to the film, but none of these shutters address the phenomena known as "thermal shock defocusing" which is film warping caused by the rapid changes in temperature/heat energy in the film when the shutter alternates between blocking and unblocking of the light.

Specifically, in the prior and present art, motion picture film contains an emulsion on one side which has a different rate of thermal expansion and contraction than the substrate of the film on which it is located. The emulsion on the film, which is more opaque than the substrate, absorbs energy and transforms it into heat more readily than the substrate. Thus, when the film is exposed to the light source, the deferential in the thermal expansion between the emulsion on the film and the substrate itself, causes the film to bow. As a result, the emulsion expands, causing the film to move from its initial position and to be drawn towards the light source, moving the film from the optimum focus plane.

However, when the light is intercepted by the shutter, any further movement of the film towards the light source comes to a halt. In other words, when there is no light on the film, the energy absorption cannot take place. Instead there is a relative loss of heat transfer which causes the film to recede or recover slightly. Thus, as each successive exposure occurs, the film surface stands somewhere between its previous position during the last frame and the zero plane. Therefore, as the film advances through the gate, there is a constantly increasing and decreasing deformation during each exposure causing the distance of the emulsion surface relative to the lens to constantly change.

FIG. 1 shows the correlation between the movement at the center of the film surface and particular instances in the frame cycle. The same movements occur at a lessor degree at points not at the center of the film surface. Thus, then thermal shock produces deterioration of the image focus during the projection cycle.

Many articles have been written in the prior discussing the deformation caused by the light source as the film moves through the gate in the motion picture projector. In one such article entitled, "Modulated Air Blast for Reducing Film Buckle," by Willy Borberg, in the August 1952 issue of the Journal of the SMPTE, the displacement at the frame center of the film is discussed, as well as one prior art method, for trying to remedy this problem. Many different methods have been tried in the prior art to overcome this thermal shock defocusing. In this article, an apparatus that air blasts the film to cool it is disclosed. Specifically, front and rear jets provided opposing air forces to produce a force for positioning the film. While this method allowed the film to be kept within acceptable focus parameters such that there was improvement in screen image definition, this method proved unreliable and inconsistent due to several variables such as the film history and its condition, different light levels and air-hose pressure changes. The air-jet noise also was considered objectionable. Further, as screens and films became larger and larger, even when the air was pulsed, the displacement of the perfect focus position from the center to the side of the frame was too large to allow improved focus definition over the entire screen.

A variation on the previous prior art method was the use of a constant pressure air chamber, either behind or in front of the film plane ("CineFocus"). Although this air pressure chamber provided resistance to the thermal drift deformation, it did not address the cyclic action of the shutter.

Another prior art method that was attempted to overcome the problem with thermal drift deformation was the development of a curved gate. For example, if the gate of a projector is curved along the axis of the film travel, it would be difficult for any of the emulsion on the film to curve transversely along an axis parallel to the frame line. Specifically, the curved gate made it harder for the film to bow out during thermal shock and minimized the common left-to-right differential focus problems common in flat gate projectors. Although the curved gate improved film rigidity, it did not prevent the negative drift from occurring especially at higher operating wattages.

Other shutters that were used in the prior art did not address the problem of the thermal drift deformation. For example in three blade shuttered projectors, while the flicker rate of the film was increased to a high enough rate so that the flicker was above the perception of most people, the shutters actually made the negative drift problem worse. Specifically, since the efficiency of the light that passes through the shutter was decreased, it necessitated the use of even higher wattage lamps to attain the same light levels, which subsequently aggravated the "thermal shock defocusing" problem.

Another prior art method that was attempted to reduce thermal drift deformation was the use of thin film optical coatings directly on the film to remove heat created by the incident light by placing a heat filter in the light path. These thin optical coatings, such as infrared reflecting, UV reflecting, and other similar type thin film coatings, allowed most of the visible light to pass through the filter while blocking some of the unwanted energy, thus minimizing the overall incident heat on the film. However, this method did not address the heat energy effect on the film as a result of the cycling of the shutter apparatus.

Another prior art method that was used in connection with reduction type projectors which are used to project mask patterns (reticles) onto surfaces of semiconductor substrates is described in U.S. Pat. No. 5,323,208 entitled Projection Exposure Apparatus. In this prior art method, the reduction-type projector utilized a stationary filter having optical coatings in or near the lens apparatus. The optical coatings used on the stationary filter were used predominately as phase shifters to strengthen the illumination and focus upon a very small area of the substrate. While this method was successful for reduction type projected images having relatively small focal lengths, it would not be successful in motion picture projectors which have an extremely long focal length. Further, insofar as the filter was in the lens and not the film plane, the problem with thermal drift deformation would not be affected.

None of the prior art methods or devices attempted to use any of the optical coatings that have been developed in the past thirty years in connection with the shutter because placing and maintaining optical coatings on the shutters existing in the prior art film projectors, would be extremely difficult and cost prohibitive. Specifically, as most classical/current projector designs utilize large diameter or conical shaped metal shutters, creating an equivalent design from a visibly transmissive substrate would be impractical, if not incredibly difficult. For example, due to the high centrifical forces being applied to the shutter (shutters typically rotate at 1440 to 3600 revolutions per minute), the mechanical strength characteristics of current suitable optical materials would not support most existing projector shutter designs.

In addition to the mechanical material strength constraints, the cost of manufacturing such a large piece (possibly vacuum formed for a conical design) of optical quality, high temperature glass would be prohibitive. In addition, the increased complexity and relative low batch yield in the optical coating process, would make the manufacture of such an item impractical.

Thus, it is an object of the present invention to develop a cost effective motion picture projector that is capable of addressing and minimizing the thermal drift deformation present in film projectors.

It is also another object of the present invention to minimize the thermal drift deformation present in, and increase the focusing abilities of, a motion picture projector.

It is yet a further object of the present invention to minimize the thermal drift deformation that is present in any projection device in which heat creates a negative effect due to cycling of a medium through an application of radiant energy, visible or otherwise.

It is another object of the present invention to significantly reduce the effect of thermal drift deformation, for a given shutter size, in an easy and cost effective (elegant) manner.

SUMMARY OF THE INVENTION

In accordance with the present invention, there is provided a shutter rotatably mounted within a projector. The shutter comprises one or more high temperature rated, transmissive substrate such as fused silica or borosilicate glass, and the like, having alternating types of coatings with different characteristics thereon. In the area(s) in which one of the coatings is located, the shutter allows radiant energy in the 400 nm to 700 nm wavelength range to pass therethrough, while reflecting energy above 700 nm and below 400 nm in wavelength. In the area(s) on the shutter in which the alternate type of coating is used, radiant energy in the 400 nm to 700 nm wavelength range is reflected and all other wavelengths of energy above 700 nm and below 400 nm passes therethrough.

In the device of the present invention, optical coatings are applied to one or both sides of the optical substrate using several different methods (e,g,, vacuum deposited, ion-beam sputtering, e-beam) such that successive thin layers of optical materials are deposited on the optical substrate. The optical coatings that are used have generic industry names such as "hot mirror" or "cold mirror," as well as vendor-specific product names like Super Heat Buster or Crystal Clear Hot Mirror.

In the preferred design of the present invention, the shutter comprises two semi-circular halves (one hot mirror, one cold mirror) which are joined together by a center hub which clamps the two halves together. Although it would be possible to use a substrate that was a single circular piece, the coating process would be complicated by requiring masking of the opposing side during each coating application.

In the preferred embodiment, the thickness of the glass is determined by the nearest standard thickness which would support the centrifugal force considerations for a chosen diameter shutter. Thus the thickness of the shutter would vary depending on the diameter and speed of the various possible shutter shapes and applications.

In operation, due to the optical coatings on the shutter of the present invention, there is less of a variation in the amount of energy affecting the film. (See FIG. 2.) Thus, due to the more evenly balanced amount of incident energy being placed on the film, the resultant thermal shock defocusing is minimized.

BRIEF DESCRIPTION OF THE DRAWINGS

A better understanding of this invention will now be had by referring to the accompanying drawings in which.

DETAILED DESCRIPTION OF THE PREFERRED EMBODIMENT

Figure 3:
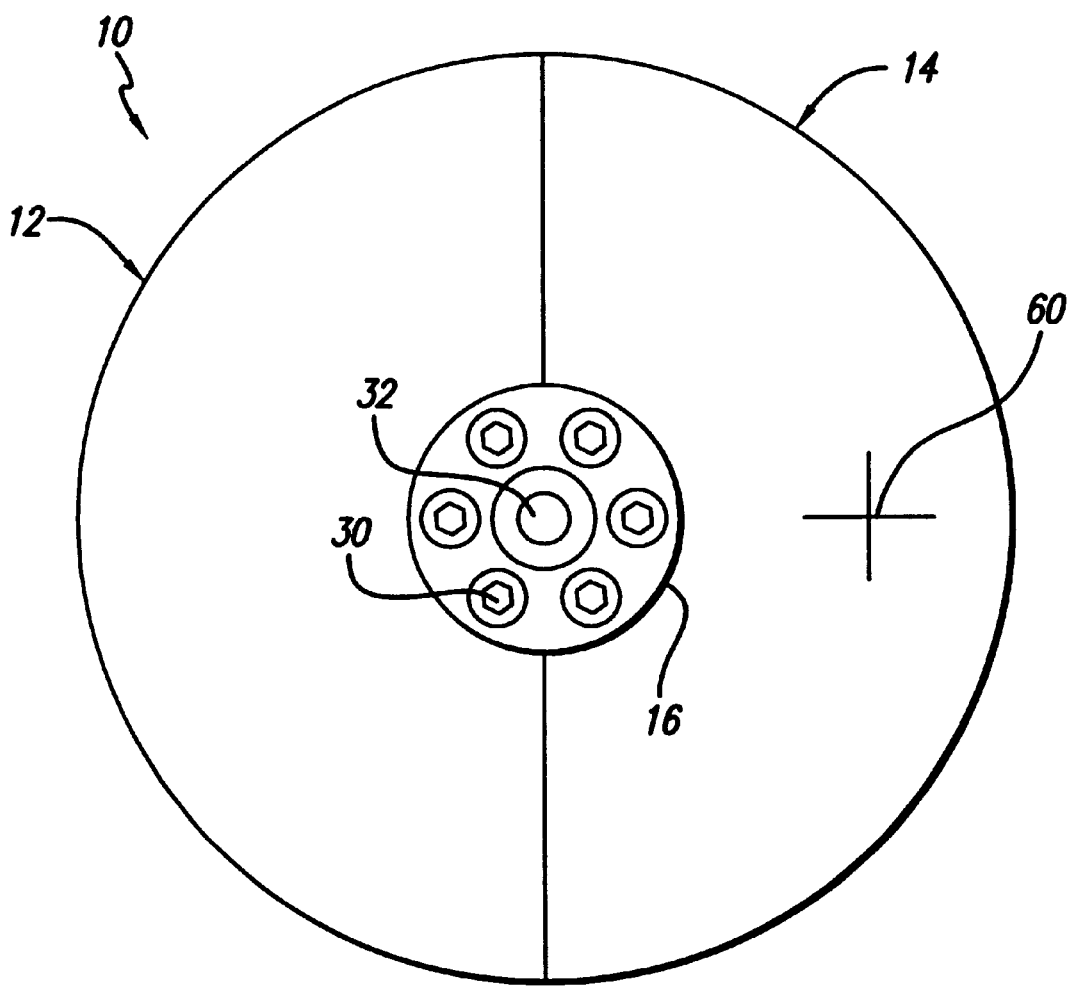
FIG. 3 is a plan view of the top surface of the shutter of the present invention.
Figure 4:
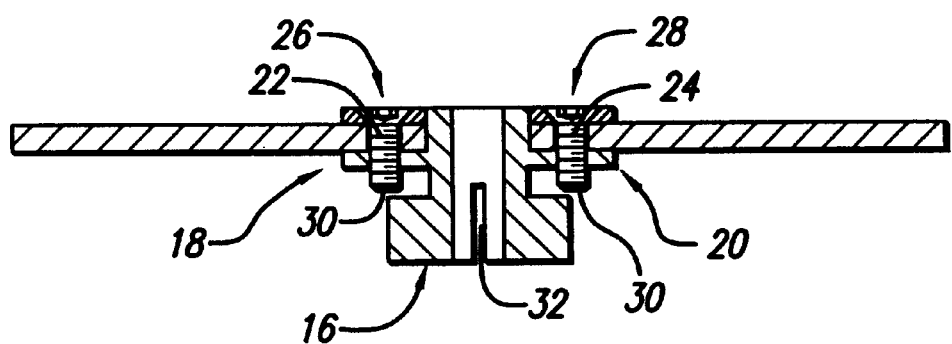
FIG. 4 is a cross sectional diagram of the shutter of the present invention taken along lines 4—4 of FIG. 3.

Referring first to FIGS. 3 and 4, the preferred embodiment of the shutter 10 of the present invention is shown. In FIG. 3, the shutter 10 is comprised of a first shutter blade 12 and second shutter blade 14. While the shape of each of these blades are substantially semicircular with identical diameters, other suitable shapes allowing for alternating blocking and unblocking of light may be used.

Shutter blades 12 and 14 are comprised of one or more high temperature rated, transmissive substrate such as fused silica, borosilicate glass, Borofloat®, Pyrex®, or the like. At least one side of each of blades 12 and 14 contains at least one or more layers of suitable optical coatings. In the preferred embodiment, one of the blades has one or more layers of "hot mirror" optical coatings thereon, e.g. optical coatings that are designed to pass radiant energy in the 400 nm to 700 nm wavelength range therethrough and reflect energy above 700 nm and below 400 nm in wavelength. One such suitable coating is known as Crystal Clear Hot Mirror manufactured by ZC & R Coatings. Also in the preferred embodiment, the other blade has one of more layers of "cold mirror" optical coatings thereon, e.g. optical coatings that are designed to reflect radiant energy in the 400 nm to 700 nm wavelength range and pass through energy above 700 nm and below 400 nm in wavelength. One such suitable coating is known as High Energy Cold Mirror manufactured by ZC& R Coatings. In only one side of the blades 12 and 14 contain the optical coatings, then that side of the blade should be installed such that it faces the light source.

The thickness of each of the blades 12 and 14 is dependent upon the diameter of the blade and the speed of the shutter shape. Thus, the nearest standard thickness which would support the centrifugal force considerations for a chosen diameter shutter is the one that is chosen for a given shutter configuration. In the preferred embodiment of the invention, a material thickness of approximately 3.3 mm is used.

In the preferred embodiment shown in FIG. 4, blades 12 and 14 have mounting holes 22 and 24 therein which are adjacent to the center of the diameter edges and which correspond to the holes 26 and 28 in a substantially circular hub 16. During assembly of the shutter 10, blades 12 and 14 are affixed together by placing the centers of the diameter edges of blades 12 and 14 into slots 18 and 20 until the holes 22 in blade 12 align with the holes 26 in hub 16 and the holes 24 in blade 14 align with the holes 28 in hub 16. In the preferred embodiment, prior to the blades being inserted, a heat resistant epoxy such as Loctite 332 is applied to the inside of slots 18 and and thermal washers (not shown) are placed between the substrates 12 and 14 a nd the hub 16. So that the metal of the hub 16 does not rub against the substrates of blades 12 and 14. Screws 30 are then placed through holes 26 and 22, and holes 28 and 24 respectively and the thermal washers and then tightened evenly with enough torque so that they will not become loosened during the spinning of the shutter 10. Instead of screws, rivets or other suitable attachment means may be utilized to affix the hub 16 to the blades 12 and 14.

Also in the preferred embodiment, screws 30 are hex screws that have some heat resistant epoxy applied thereto prior to being inserted through the holes. Hub 16 has a hole 32 through which the shutter is movably mounted to the projector assembly as shown in FIG. 5, so that it is allowed to rotate about its y axis.

Figure 5:
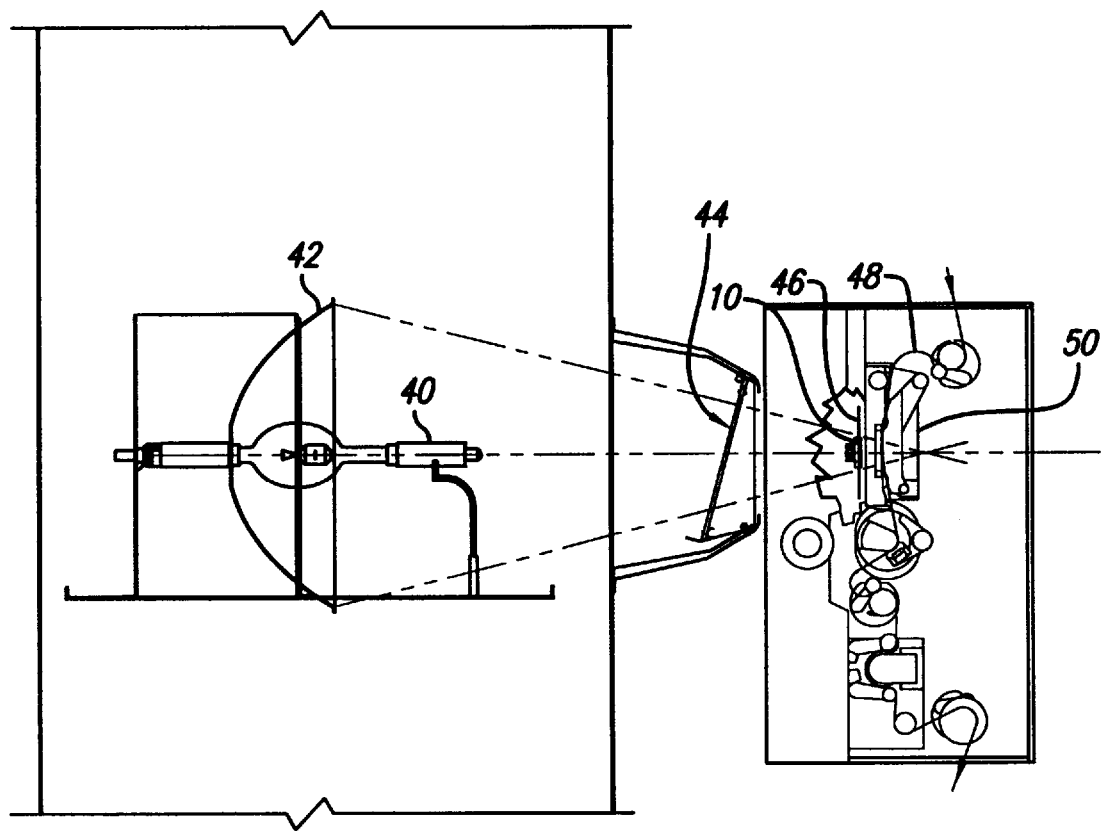
FIG. 5 is an explanatory diagram showing the positioning of the shutter in relation to the film and light source.

Specifically, FIG. 5 illustrates the projector assembly with the shutter 10 mounted therein. Lamp 40 is mounted within reflector 42. The UV/IR components of the reflected and incident light from lamp 40 may be partially filtered through an optional filter 44 (which may or may not be present in a given projection system) prior to being blocked and unblocked by the alternating blades 12 and 14 of shutter 10. Shutter 10 is mounted prior to the aperture 46. Film 48 advances through trap and gate 50 where it is exposed to the incident light traveling through aperture 46.

In the preferred embodiment, blades 12 and 14 are manufactured separately. However, a singular substantially circular substrate could be used in lieu of separate blades so long as certain areas of the single substrate were masked during the application of the alternate type of optical coatings. Likewise, blades 12 and 14 could be comprised of more than two blades with suitable modifications to the hub, so long as there was alternating hot and cold mirror coatings on each of the alternating blades. Blades 12 and 14 also could be comprised of one or more blades separated by open areas, wherein each of the blades has identical cold mirror coatings thereon, such that the incident energy would pass through the openings and be reflected by the cold mirror coatings as the shutter 10 is spinning around the y axis.

In the preferred embodiment during the operation of the projector, the rotation of the shutter 10 is synchronized by using a timing location such as the one represented by the cross 60 in FIG. 3 to ensure that the placement of the hot and cold mirror blades 12 and 14 corresponds to the rate of the advancement of the film through the gate 50. Specifically, the shutter is synchronized to the movement of the film so that the blade(s) having the cold mirror coating appears in front of the light as the film advances through the gate such that the light is blocked even though the heat energy is passing therethrough, while the blade having the hot mirror coating appears in from of the light as the film is in the gate.

Figure 1:
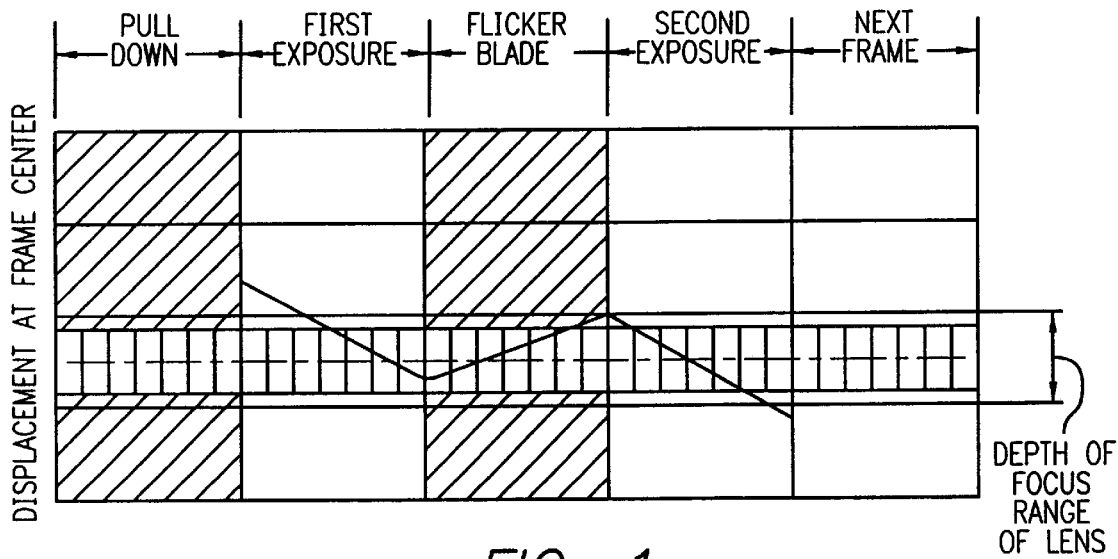
FIG. 1 is a graph plotting the thermal drift formation present in prior art devices.
Figure 2:
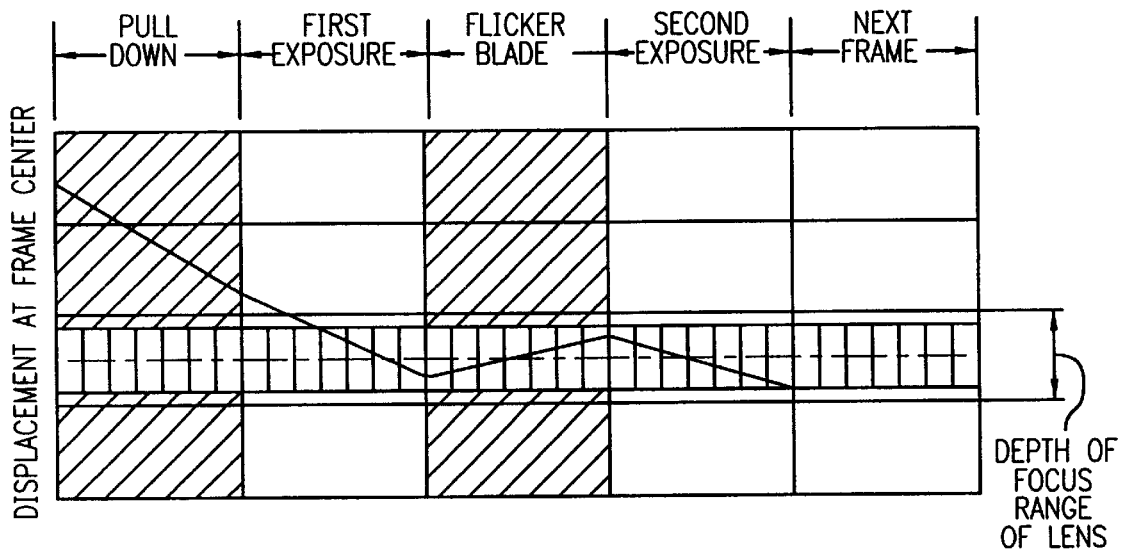
FIG. 2 is a graph plotting the thermal drift formation present in projectors using the shutter of the present invention.

The invention operates to more evenly distribute the incident heat on the film than in prior art methods both during and after exposure of the film to the light energy. Specifically, as shown in FIG. 2, there is less of a variation in the thermal shock displacement of the film at the frame center using the shutter of the present invention than there is using the devices of the prior art, as is shown in FIG. 1. In this manner, the amount of the warping of a motion picture film as it passes through the projector is minimized. Thus, the system and method of the present invention is able to minimize the thermal shock on the film that is created by the variations in the heat energy given off by the lamp, by balancing the application of the energy to which the film is exposed.

Other applications for the shutter 10 are contemplated besides its use in motion picture projectors, such as its use in X-Ray, high intensity light curing systems, semiconductor processing systems and other medical equipment in which a light source is focused on an object or surface.

While particular embodiments and techniques of the present invention have been shown and illustrated herein, it will be understood that many changes, substitutions and modifications may be made by those persons skilled in the art. It will be appreciated from the above description of presently preferred embodiments and techniques that other configurations and techniques are possible and within the scope of the present invention. Thus, the present invention is not intended to be limited to the particular embodiments and techniques specifically discussed hereinabove.

What is claimed is:

1. A new and improved shutter for projectors having a high energy source for projecting or displaying media that can be thermally distorted as it advances through the projector, comprising:
   a high temperature rated, transmissive substrate;
   a cold mirror coating affixed to certain areas of said substrate;
   synchronization means for synchronizing the placement of the substrate containing the cold mirror coating in front of the high energy source as the media is advancing through the projector, such that the thermal deformation of the media is minimized.

2. The shutter of claim 1, wherein said substrate comprise other areas in which only hot mirror coatings have been applied, such that said synchronization ensures that the hot mirror coating is placed in front of the high energy source as the media is being read by the projector.

3. The shutter of claim 2 wherein said cold mirror substrate area and said hot mirror substrate area each comprised of substantially equivalent semicircular areas which are joined together to form a substantially circular shape.

4. The shutter of claim 1 wherein said substrate comprises at least one semi-circle.

5. The shutter of claim 1 wherein the thickness of said substrate is determined by the diameter and speed of the shutter and the centrifugal forces applied thereto.

6. The shutter of claim 1 wherein the cold mirror areas of said substrate are comprised of substantially pie shaped wedge areas which are connected together where the areas converge.

7. The shutter of claim 5 wherein the hot mirror areas are comprised of substantially pie shaped wedge areas which are interspersed between the cold mirror areas.

8. In a film projection system which contains a lighting device emitting a large amount of heat energy and means for advancing film through a gate, a new and improved shutter comprising:

a high temperature rated, transmissive substrate having first and second areas;

a first optical coating affixed to said first area of said substrate, wherein said optical coating allows radiant energy in the visible spectrum to pass therethrough, while reflecting energy above and below the visible spectrum;

a second optical coating affixed to said second area of said substrate wherein said optical coating allows radiant energy in the visible spectrum to be reflected therefrom while allowing radiant above and below the visible spectrum to pass therethrough;

synchronization means for synchronizing the placement of said first and second areas of said substrates such that said second area is placed in front of the light source when the film is moving through the gate and said first area is placed in front of the light source when the film is located within the gate, such that the thermal deformation of the film is minimized.

9. The shutter of claim 8 wherein said first and said second areas of said substrate each are substantially semicircular and connected together to form a substantially circular shape.

10. The shutter of claim 8, wherein said first and second areas comprise alternating pie shaped areas on a circular substrate.

11. The shutter of claim 8 wherein the thickness of said substrate is determined by the diameter and speed of the shutter and the centrifugal forces applied thereto.

12. A new and improved shutter for projectors having a high energy source for projecting or displaying media that can be thermally distorted as it advances through a projector, comprising:

a high temperature rated, transmissive substrate having evenly spaced openings therein;

a cold mirror coating affixed to said substrate in the areas proximate said openings;

synchronization means for synchronizing the placement of the substrate containing the cold mirror coating in front of the high energy source as the media is advancing through the projector, such that the thermal deformation of the media is minimized.

13. The shutter of claim 12, wherein said openings comprise additional areas of said substrate in which hot mirror coatings have been applied, such that said synchronization ensures that the hot mirror coating is placed in front of the high energy source as the media is being displayed by the projector.

14. The shutter of claim 12 wherein said substrate comprises a semi-circle and said opening comprises a semicircle.

15. The shutter of claim 13, wherein said cold mirror areas comprise a semicircle and said hot mirror areas comprise a semicircle which are joined together to form a circle.

* * * * *